(12) United States Patent
Lee

(10) Patent No.: US 9,139,184 B2
(45) Date of Patent: Sep. 22, 2015

(54) BRAKE SYSTEM

(71) Applicant: MANDO CORPORATION, Pyeongtaek-si, Gyeonggi-do (KR)

(72) Inventor: Chung Jae Lee, Gunpo-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 53 days.

(21) Appl. No.: 14/038,688

(22) Filed: Sep. 26, 2013

(65) Prior Publication Data
US 2014/0084674 A1 Mar. 27, 2014

(30) Foreign Application Priority Data
Sep. 27, 2012 (KR) .................. 10-2012-0107538

(51) Int. Cl.
| | | |
|---|---|---|
| B60T 17/04 | (2006.01) | |
| B60T 13/14 | (2006.01) | |
| B60T 8/40 | (2006.01) | |
| B60T 8/48 | (2006.01) | |

(52) U.S. Cl.
CPC ............ B60T 13/142 (2013.01); B60T 8/4068 (2013.01); B60T 8/4872 (2013.01)

(58) Field of Classification Search
CPC ...... B60T 8/4068; B60T 8/4872; F16L 55/04; F16L 55/041
USPC ............. 188/87; 138/30, 31; 303/87
See application file for complete search history.

(56) References Cited

U.S. PATENT DOCUMENTS

| 4,989,924 | A | 2/1991 | Toda et al. | |
|---|---|---|---|---|
| 6,231,132 | B1* | 5/2001 | Watanabe | 303/87 |
| 8,881,771 | B2* | 11/2014 | Lee | 138/31 |
| 2012/0025598 | A1* | 2/2012 | Park et al. | 303/2 |
| 2012/0043805 | A1* | 2/2012 | Park | 303/9.62 |
| 2012/0049616 | A1* | 3/2012 | Park | 303/9.62 |

FOREIGN PATENT DOCUMENTS

| KR | 2000-0016747 | 9/2000 |
|---|---|---|
| KR | 2012-0018416 A | 3/2012 |
| KR | 2012-0018417 A | 3/2012 |

OTHER PUBLICATIONS

Chinese Office Action issued in Chinese Application No. 201310451378.9 dated Jun. 2, 2015.

* cited by examiner

Primary Examiner — Thomas J Williams
(74) Attorney, Agent, or Firm — McDermott Will & Emery LLP

(57) ABSTRACT

Disclosed herein is a brake system capable of reducing periodic pressure pulsation generated by operation of a pump. The brake system includes a damper member provided with a cylinder having a step portion and a piston to reciprocate between the cylinder and the cap. The piston may be prevented from being excessively pushed toward one side of the damper member, and pressure pulsation generated by operation of the pump may be attenuated. Therefore, overall operating noise may be reduced during control the brake and product reliability may be increased.

8 Claims, 3 Drawing Sheets

BRAKE SYSTEM

CROSS-REFERENCE TO RELATED APPLICATION(S)

This application claims the benefit of Korean Patent Application No. 2012-0107538, filed on Sep. 27, 2012 in the Korean Intellectual Property Office, the disclosure of which is incorporated herein by reference.

BACKGROUND

1. Field

Embodiments of the present invention relate to a brake system which may reduce pressure fluctuation which occurs during operation of a piston.

2. Description of the Related Art

A brake system is essentially mounted on a vehicle for braking of the vehicle, and various systems have recently been proposed to obtain stronger and more stable braking force. Examples of the brake system include an anti-lock braking system (ABS), a brake traction control system (BTCS), and a vehicle dynamic control system (VDC). The ABS prevents wheels from skidding upon braking. The BTCS prevents slippage of driving wheels during rapid acceleration from a stop or sudden unintended acceleration of a vehicle. The VDC maintains a stable driving state of a vehicle by controlling a brake oil pressure through a combination of the ABS and the BTCS.

Such a brake system includes a master cylinder to generate a pressure necessary for braking, a plurality of solenoid valves to control a braking oil pressure transmitted to a wheel brake of a vehicle, a low-pressure accumulator to temporarily store oil, a pump and a motor to forcibly pump the oil stored in the low-pressure accumulator, an orifice to reduce the pressure pulsation of the oil pumped by the pump, and an electronic control unit (ECU) to electrically control the operations of the solenoids and the pump. The valve assembly of the solenoids, the accumulator, the pump, and the motor are compactly installed in a hydraulic block (modulator block) made of aluminum, and the ECU is provided with an ECU housing in which the coil assembly of the solenoid valves and a circuit board are embedded, and is coupled to the hydraulic block.

In the conventional brake system as described above, sudden pressure pulsation generated due to driving of the pump in the process of increasing the braking pressure is reduced by the orifice provided at a discharge port of the pump. However, since this is achieved by a structure that adjusts a cross-sectional area of a flow channel simply in order to reduce damping, there may be a limit in completely reducing pressure pulsation.

As another method to reduce pressure pulsation, the number of pistons of a pump may be increased. This method increases the overall performance of a motor and the weight and volume of a module, leading to an increase in manufacturing costs. If a peak of pressure pulsation caused by driving of the pump is successively generated, operating noise in a brake system may occur.

SUMMARY

Therefore, it is an aspect of the present invention to provide a brake system capable of reducing periodic pressure pulsation generated by operation of a pump.

Additional aspects of the invention will be set forth in part in the description which follows and, in part, will be obvious from the description, or may be learned by practice of the invention.

In accordance with one aspect of the present invention, a brake system including at least one wheel brake provided to each of the front wheel and rear wheels of a vehicle to exhibit braking force with a braking oil pressure transmitted thereto from a master cylinder, a solenoid valve provided at each of an inlet and an outlet of the wheel brake to control flow of the braking oil pressure, a pump to pressurize an oil discharged from the wheel brake during depressurizing braking operation by the solenoid valve and to discharge the pressurized oil to the wheel brake or the master cylinder, an orifice provided at a discharge outlet of the pump, and a damper member arranged to communicate with a main flow channel between the discharge outlet of the pump and the orifice, wherein the damper member includes a cylinder arrange to communicate with the main flow channel and provided with a first step portion stepped at one side of the cylinder, a cap coupled to the cylinder and provided with a second step portion stepped to face the first step portion, and a piston arranged to reciprocate between the first step portion provided to the cylinder and the second step portion provided to the cap.

The damper member may further include a plurality of springs to support both sides of the piston, wherein the piston is provided with a protrusion protruding in a radial direction, and the springs are installed at left and right sides of the protrusion along an outer circumferential surface of the piston.

The damper member may further include a plurality of springs to support both sides of the piston, wherein the piston is provided with first and second protrusions protruding in a radial direction, and the springs are installed along an outer circumferential surface of the piston between the cylinder and the first protrusion and between the cap and the second protrusion, wherein a sealing element is installed between the first protrusion and the second protrusion.

The cylinder and the cap may be provided with an insert groove, wherein a shock absorption element may be inserted into the insert groove.

Both ends of the piston may contact the shock absorption element.

The brake system may include a first hydraulic circuit to connect a first port of the master cylinder to two wheel brakes to control transfer of oil pressure, and a second hydraulic circuit to connect a second port of the master cylinder to other two wheel brakes to control transfer of oil pressure, wherein the damper member may be arranged to communicate with a main flow channel of the first hydraulic circuit and a main flow channel of the second hydraulic circuit.

In accordance with one aspect of the present invention, a brake system including a pump arranged in a hydraulic circuit connecting a master cylinder to at least one wheel brakes to transfer oil pressure to discharge an oil to the wheel brake or the master cylinder, an orifice provided at a discharge outlet of the pump, and a damper member arranged to communicate with a main flow channel between the discharge outlet of the pump and the orifice, wherein the damper member includes a cylinder arranged to communicate with the main flow channel and provided with a first step portion stepped at one side of the cylinder, and a first insert groove formed by stepping one side of the first step portion, a cap coupled to the cylinder and provided with a second step portion stepped to face the first step portion, and a second insert groove stepped to face the first insert groove, a shock absorption element inserted into the first insert groove and the second insert groove, a piston having both ends to contact the shock absorption element and arranged to reciprocate between the first step portion provided to the cylinder and the second step portion provided to the cap, and a plurality of springs installed along an outer circumferential surface of the piston to support both sides of the piston.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
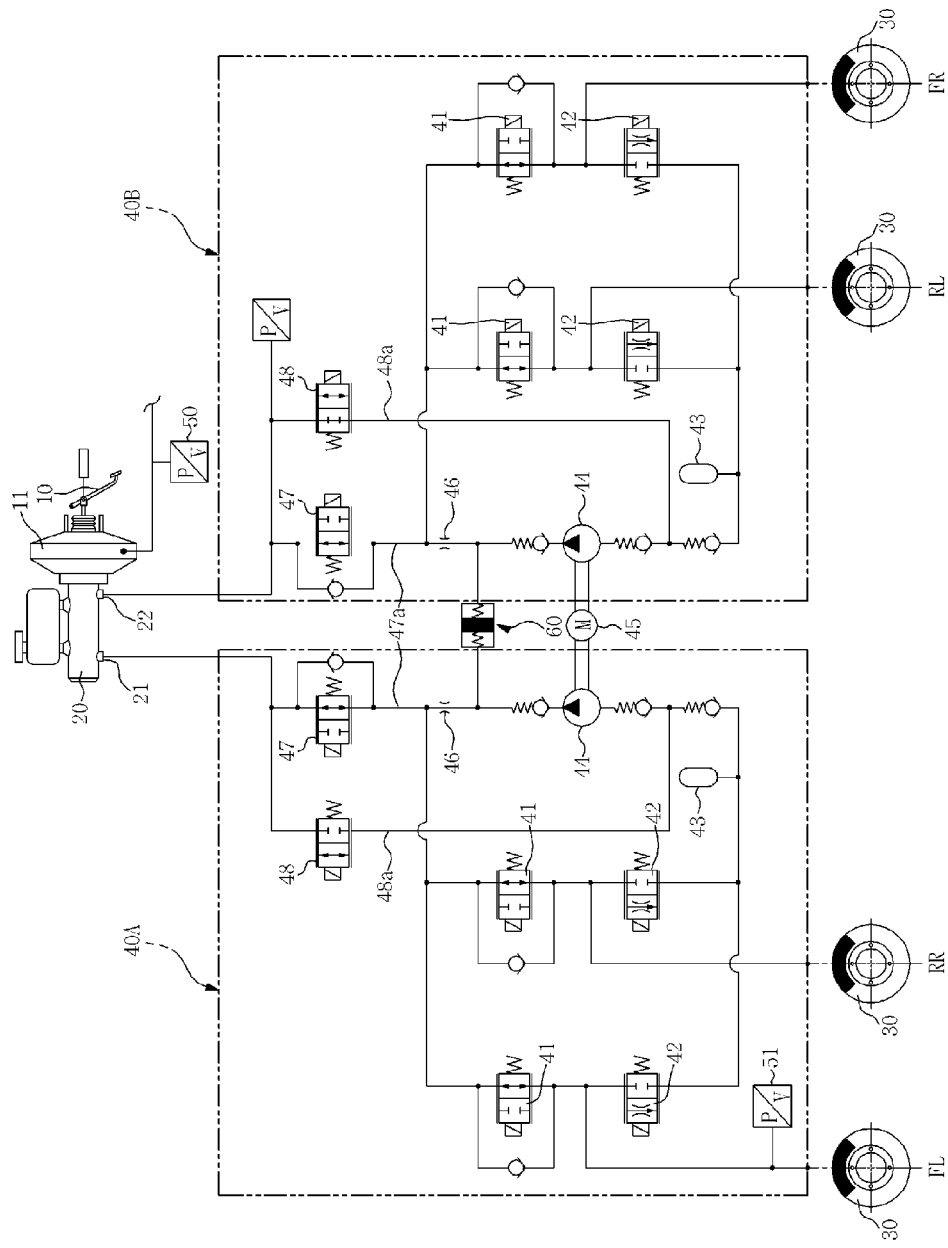
FIG. 1 is a view showing a brake system according to an embodiment of the present invention.

Reference will now be made in detail to the embodiments of the present invention, examples of which are illustrated in the accompanying drawings, wherein like reference numerals refer to like elements throughout.

As shown in FIG. 1, a brake system according to an embodiment of the present invention includes a brake pedal 10 to receive a drivers manipulation force, a brake booster 11 to increase foot force using a pressure difference between vacuum pressure and atmospheric pressure caused by the foot force on the brake pedal 10, a master cylinder 20 to generate pressure through the brake booster 11, a first hydraulic circuit 40A to control transmission of oil pressure by connecting a first port 21 of the master cylinder 20 and two wheel brakes 30 (or wheel cylinders), and a second hydraulic circuit 40B to control transmission of oil pressure by connecting a second port 22 of the master cylinder 20 and the remaining two wheel brakes 30. The first hydraulic circuit 40A and the second hydraulic circuit 40B are compactly installed in the hydraulic block.

Each of the first hydraulic circuit 40A and the second hydraulic circuit 40B includes solenoid valves 41 and 42 to control a braking oil pressure transmitted to two wheel brakes 30, a pump 44 to suction and pump oil flowing from the wheel brakes 30 or oil from the master cylinder 20, a low-pressure accumulator 43 to temporarily store oil from the wheel brakes 30, an orifice 46 to reduce pulsation in oil pressure that is pumped from the pump 44, and an auxiliary flow channel 48a to guide oil of the master cylinder 20 to be suctioned into the inlet of the pump 44 in a TCS mode.

The solenoid valves 41 and 42 are connected to upstream and downstream of the wheel brake 30. The solenoid valves 41 and 42 are classified into a normally open type solenoid valve 41 and a normally closed type solenoid valve 42. The normally open type solenoid valve 41 is disposed at the upstream side of each wheel brake 30 and maintained in an open state in a normal mode. The normally closed type solenoid valve 42 is disposed at a downstream side of each wheel brake 30 and maintained in a closed state in a normal mode. The on-off operation of the solenoid valves 41 and 42 is controlled by an ECU (not shown) that senses a vehicular speed through a wheel speed sensor disposed at each wheel. When the normally closed type solenoid valve 42 is opened according to depressurization braking, oil discharged from the wheel brakes 30 is temporarily stored in the low-pressure accumulator 43.

The pump 44 is driven by the motor 45 to transmit oil pressure toward the wheel brake 30 or the master cylinder 20 by suctioning the oil stored in the low-pressure accumulator 43 and discharging the suctioned oil toward the orifice 46.

A Normally-Open type solenoid valve 47 to control traction (hereinafter, referred to as a TC valve) is installed in a main flow channel 47a connecting the master cylinder 20 and the outlet of the pump 44. The TC valve 47 is maintained in an open state in a normal mode, and braking oil pressure generated in the master cylinder 20 is transmitted to the wheel brakes 30 through the main flow channel 47a in general braking through the brake pedal 10.

The auxiliary passage 48a, is branched from the main passage 47a, guides the oil of the master cylinder 20 to be suctioned into the inlet of the pump 44. A shuttle valve 48 is installed in the auxiliary passage 48a such that the oil flows only to the inlet of the pump 44. The shuttle valve 48, which electrically operates, is installed in the middle of the auxiliary passage 48a. The shuttle valve 48 is closed in a normal mode and is opened in a TCS mode.

In addition, a pressure sensor 50 to sense vacuum pressure of the brake booster 11 and atmospheric pressure is installed at the brake booster 11, and a wheel pressure sensor 51 is provided to each of front left/front right wheels FL and FR and rear left/rear right wheels RL and RR to sense actual braking pressure applied thereto. The pressure sensors 50 and 51 are electrically connected to and controlled by the ECU.

In addition, a damper member 60 to reduce pressure pulsation of the pump 44 is provided between the discharge port of the pump 44 and the orifice 46.

Figure 2:
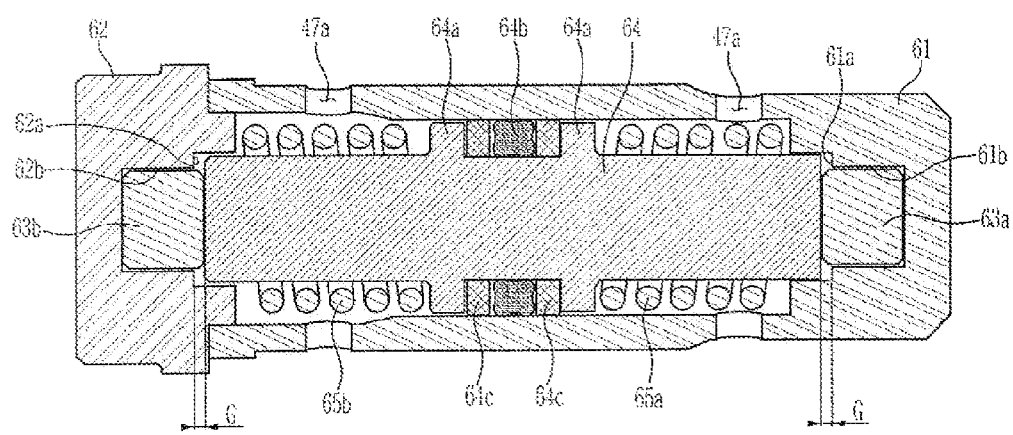
FIG. 2 is a cross-sectional view showing assembly of a damper member of the brake system according to the embodiment of the present invention.
Figure 3:
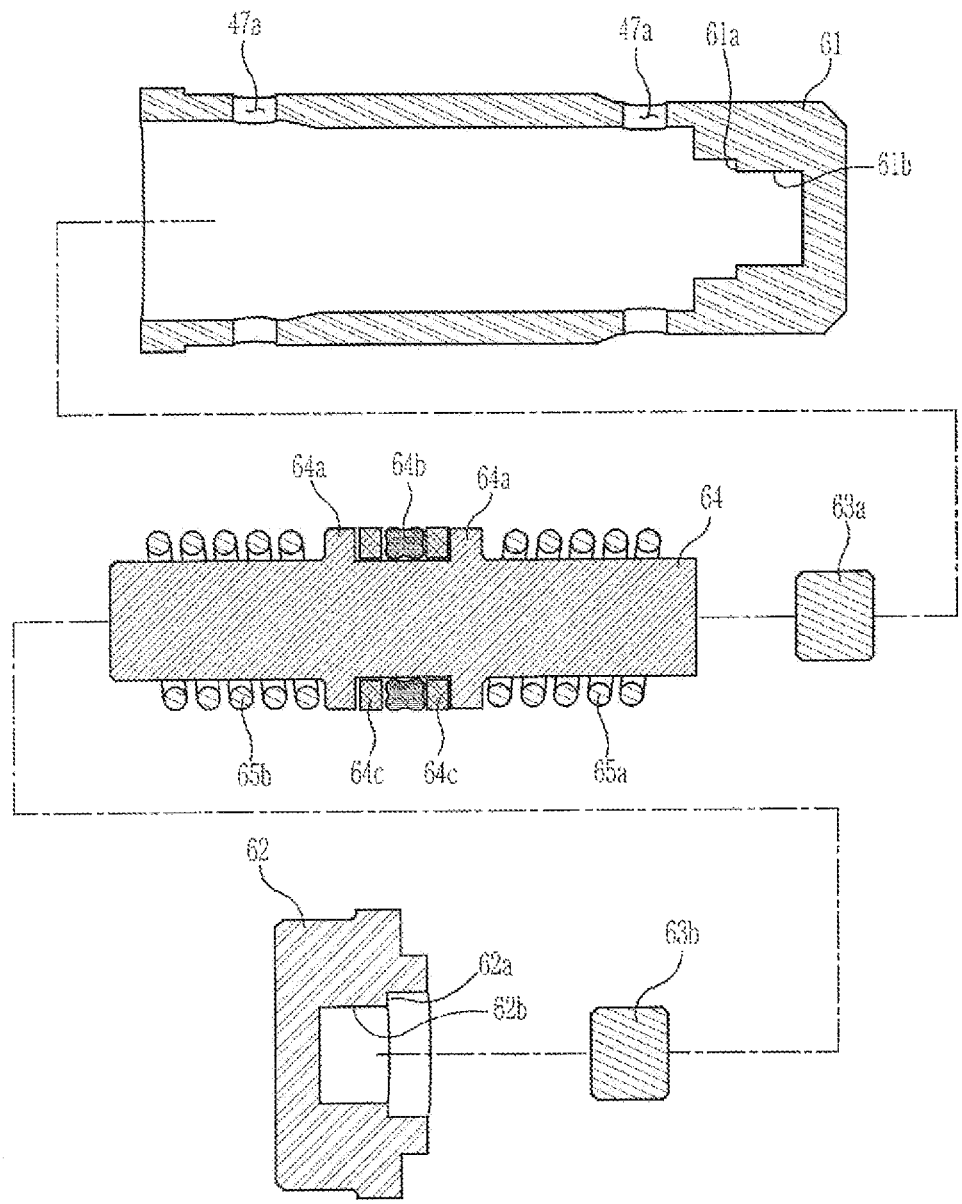
FIG. 3 is an exploded cross-sectional view showing the damper member of the brake system shown in FIG. 2.

As shown in FIGS. 2 and 3, the damper member 60 includes a cylinder 61, a cap 62, shock absorption elements 63a and 63b, a piston 64 and springs 65a and 65b.

The cylinder 61 is arranged to communicate with each main flow channel 47a of the first hydraulic circuit 40A and the second hydraulic circuit 40B installed in a hydraulic block (not shown). In addition, the cylinder 61 includes a first step portion 61a forming a step at one side of the cylinder 61 and a first insert groove 61b forming a step at one side of the first step portion 61a.

The cap 62 is coupled to the cylinder 61. The cap 62 includes a second step portion 62a stepped to face the first step portion 61a formed in the cylinder 61 and a second insert groove 62b stepped to face the first insert groove 61b.

The shock absorption elements 63a and 63b are inserted into the first insert groove 61b and the second insert groove 62b to attenuate shock occurring when the piston 64 reciprocates between the cylinder 61 and the cap 62. The shock absorption elements 63a and 63b may be formed of rubber to attenuate shock according to movement of the piston 64.

In addition, the shock absorption elements 63a and 63b may protrude a certain distance from the insert grooves 61b to attenuate shock according to movement of the piston 64.

The piston 64 is inserted into the cylinder 61 and reciprocates between the first step portion 61a formed in the cylinder 61 and the second step portion 62a formed in the cap 62. Since the piston 64 reciprocates between the step portions 61a and 62a formed in the cylinder 61 and the cap 62, the stroke of the piston 64 is restricted according to the shape of the step portions 61a and 62a. In addition, since the piston 64 reciprocates between the step portions 61a and 62a formed in the cylinder 61 and the cap 62, the piston 64 is prevented from being excessively pushed toward the cylinder 61 or the cap 62.

In addition, both ends of the piston 64 may be in contact with the shock absorption elements 63a and 63b to attenuate shock according to movement of the piston 64. Herein, as both ends of the piston 64 are in contact with the shock absorption elements 63a and 63b, respectively, a gap corresponding to the distance that the shock absorption elements 63a and 63h protrude from the ends of the step portions 61a and 62a is formed between the ends of the step portions 61a and 62a and both ends of the piston 64 and the piston 64 reciprocates through this gap G.

The gap G is formed to protrude a certain distance from the insert grooves 61b and 62b. The gap G may be controlled by adjusting the shape of the shock absorption elements 63a and 63b.

Meanwhile, springs 65a and 65b to support the piston 64 are respectively installed at left and right sides of the piston 64. Herein, the piston 64 is provided with a protrusion 64a protruding in a radial direction of the piston 64, and the springs 65a and 65b are installed along the outer circumferential surface of the piston 64 at the left and right sides of the protrusion 64a.

In addition, a plurality of protrusions 64a may be formed on the piston 64 such that a sealing element 64b may be installed between the protrusions 64a. Further, a backup ring 64c may be installed between the protrusion 64a and the sealing element 64b.

That is, the piston 64 is provided with a plurality of protrusions 64a protruding in a radial direction of the piston 64, and the springs 65a and 65b are respectively installed along the outer circumferential surface of the piston 64 between the cylinder 61 and the side of the protrusions 64a facing the cylinder 61 and between the cap 62 and the side of the protrusions 64a facing the cap 62. The sealing element 64b and the backup ring 64c are positioned between the protrusions 64a.

Hereinafter, braking operation of a brake system configured as above will be described.

First, a driver pushes down the brake pedal 10 so as to slow the vehicle while driving or to maintain a stationary state. Thereby, a boosted force higher than the input force is generated in the brake booster 11 and thus a considerable braking oil pressure is generated in the master cylinder 20. The braking operation is performed as the braking oil pressure is transmitted to the front wheels FR and FL and the rear wheels RR and RL through the solenoid valves 41. If the driver gradually or completely takes his/her foot off the brake pedal 10, oil pressure in each wheel brake is returned to the master cylinder 20 through the solenoid valves 41. Thereby, the braking force is reduced or braking is completely released.

Meanwhile, pressure pulsation having a regular half sine wave is generated in the brake system due to a pair of pumps 44 which is driven with a phase difference of 180 degrees by a single driving motor 45 during the braking operation. This pressure pulsation is attenuated by the damper member 60.

That is, the pressure of oil discharged through the discharge port of the pump 44 is supplied to the damper member 60, the cross-sectional area of which is varied by the piston 64 and the springs 65a and 65b. Accordingly, most pressure pulsation is attenuated as pressure balance is formed between the hydraulic circuits 40A and 40B.

Therefore, the pressure pulsation of the regular half sine wave is completely removed by the damper member 60 and the orifice 46, and the uniform oil pressure is transmitted to the master cylinder 20 or the solenoid valves 41.

As is apparent from the above description, a brake system according to one embodiment of the present invention has a damper member installed between the outlet port of the pump and the orifice to attenuate pressure pulsation generated by operation of the pump. Therefore, overall operating noise may be reduced during control the brake and product reliability may be increased.

In addition, since the piston provided in the damper member is arranged to reciprocate between step portions formed in the cylinder and the cap, the piston may be prevented from being excessively pushed toward one side of the damper member.

Further, since shock absorption elements are in contact with both ends of the piston, shock caused by reciprocation of the piston may be attenuated.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A brake system including at least one wheel brake provided to each of the front wheel and rear wheels of a vehicle to exhibit braking force with a braking oil pressure transmitted thereto from a master cylinder, a solenoid valve provided at each of an inlet and an outlet of the wheel brake to control flow of the braking oil pressure, a pump to pressurize an oil discharged from the wheel brake during depressurizing braking operation by the solenoid valve and to discharge the pressurized oil to the wheel brake or the master cylinder, an orifice provided at a discharge outlet of the pump, and a damper member arranged to communicate with a main flow channel between the discharge outlet of the pump and the orifice, wherein the damper member comprises:
a cylinder arranged to communicate with the main flow channel and provided with a first step portion stepped at one side of the cylinder;
a cap coupled to the cylinder and provided with a second step portion stepped to face the first step portion; and
a piston arranged to reciprocate between the first step portion provided to the cylinder and the second step portion provided to the cap,
wherein the piston includes a first distal end face facing the first step portion and a second distal end face facing the second step portion,
the first distal end face having an outer diameter greater than an inner diameter of the first step portion,
the second distal end face having an outer diameter greater than an inner diameter of the second step portion,
the cylinder and the cap are provided with an insert groove, and
a shock absorption element is inserted into each insert groove.

2. The brake system according to claim 1, wherein the damper member further comprises a plurality of springs to support both sides of the piston,
wherein the piston is provided with a protrusion protruding in a radial direction, and the springs are installed at left and right sides of the protrusion along an outer circumferential surface of the piston.

3. The brake system according to claim 1, wherein the damper member further comprises a plurality of springs to support both sides of the piston,
wherein the piston is provided with first and second protrusions protruding in a radial direction, and the springs are installed, along an outer circumferential surface of the piston between the cylinder and the first protrusion and between the cap and the second protrusion, wherein a sealing element is installed between the first protrusion and the second protrusion.

4. The brake system according to claim 1, wherein the first distal end face and the second distal end face are positioned outwardly beyond the plurality of springs, respectively, in a longitudinal direction of the cylinder.

5. The brake system according to claim 1, wherein both ends of the piston contact the shock absorption element.

6. The brake system according to claim 1, wherein the brake system comprises a first hydraulic circuit to connect a first port of the master cylinder to two wheel brakes to control transfer of oil pressure, and a second hydraulic circuit to connect a second port of the master cylinder to other two wheel brakes to control transfer of oil pressure,
wherein the damper member is arranged to communicate with a main flow channel of the first hydraulic circuit and a main flow channel of the second hydraulic circuit.

7. A brake system including a pump arranged in a hydraulic circuit connecting a master cylinder to at least one wheel brakes to transfer oil pressure to discharge an oil to the wheel brake or the master cylinder, an orifice provided at a discharge outlet of the pump, and a damper member arranged to communicate with a main flow channel between the discharge outlet of the pump and the orifice,
wherein the damper member comprises:
a cylinder arranged to communicate with the main flow channel and provided with a first step portion stepped at one side of the cylinder, and a first insert groove formed by stepping one side of the first step portion;
a cap coupled to the cylinder and provided with a second step portion stepped to face the first step portion, and a second insert groove stepped to face the first insert groove;
a shock absorption element inserted into the first insert groove and the second insert groove;
a piston having both ends to contact the shock absorption element and arranged to reciprocate between the first step portion provided to the cylinder and the second step portion provided to the cap; and
a plurality of springs installed along an outer circumferential surface of the piston to support both sides of the piston,
wherein the both ends of the piston are positioned outwardly beyond the plurality of springs, respectively, in a longitudinal direction of the cylinder.

8. The brake system according to claim 7, wherein the both ends of the piston includes a first distal end face facing the first step portion and a second distal end face facing the second step portion,
the first distal end face having an outer diameter greater than an inner diameter of the first step portion, and
the second distal end face having an outer diameter greater than an inner diameter of the second step portion.

* * * * *